June 2, 1936.    E. B. WALLACE    2,042,689

MOTOR VEHICLE IDENTIFYING MEANS

Filed April 10, 1935

Inventor
Edward B. Wallace,

By Clarence A. O'Brien
Attorney

Patented June 2, 1936

2,042,689

UNITED STATES PATENT OFFICE 2,042,689

MOTOR VEHICLE IDENTIFYING MEANS

Edward B. Wallace, Avoca, Pa.

Application April 10, 1935, Serial No. 15,689

1 Claim. (Cl. 116—32)

This invention relates to identifying means for motor vehicles, the general object of the invention being to place material on the bumper of an automobile which is of such a nature that when the automobile strikes a person or object part will be knocked from the bumper and thus the automobile can be traced through the material knocked therefrom.

This invention also consists in certain other features of construction and in the combination and arrangement of several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
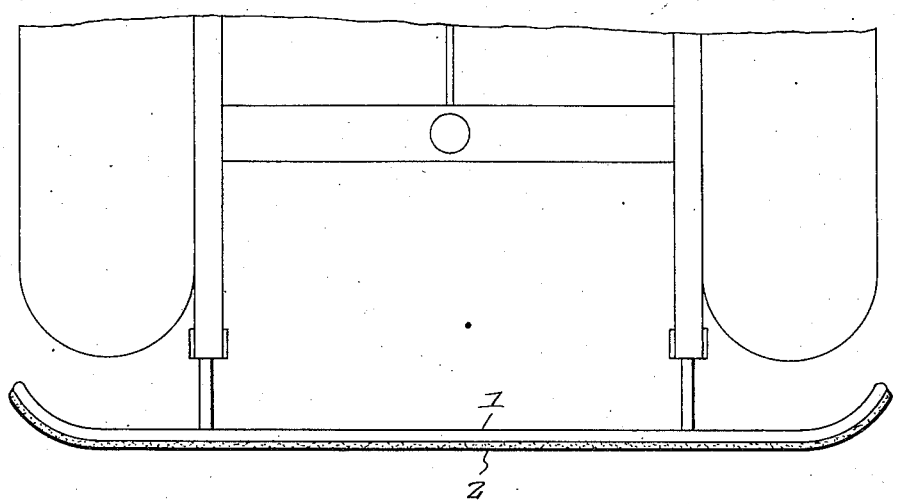
Figure 1 is a fragmentary top plan view of an automobile showing the same equipped with a bumper constructed in accordance with this invention.
Figure 2:
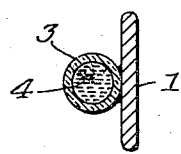
Figure 2 is a sectional view through a bumper having one form of identification means.
Figure 3:
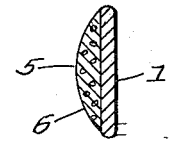
Figure 3 is a similar view showing a bumper provided with another form of identification means.

In this drawing the numeral 1 indicates the bumper of an automobile and the numeral 2 indicates the material placed on the front face of the bumper. This material may be in the form of a large glass tube 3 containing powder or other material 4 as shown in Figure 3 or it may be a coating 5 of enamel or the like having particles 6 therein.

Any suitable kind of material can be used so that the material will be broken off the bumper when the same strikes a pedestrian or other object and the material left on the street will be sufficient to permit the authorities to tell the nature of the material and thus identify the material with a particular automobile so that the authorities can ascertain what automobile caused the accident and thus find the owner of the same, if the driver left the scene of the accident.

It will, of course, be understood that the kind or type of material used on the bumper of each vehicle will be recorded in the traffic bureau or other place of authority so that the automobile causing the accident and leaving the scene can be traced from the records which would include the kind of material carried by the bumper of each vehicle permitted to operate in the city where the records are kept.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A bumper for an automobile having a longitudinally extending tube of fragile material rigidly connected with its front face and extending from one end of the bumper to the other end and containing identifying material which will scatter upon the roadway if the tube is broken by the bumper striking an object.

EDWARD B. WALLACE.